UNITED STATES PATENT OFFICE.

CHARLES L. IRESON, OF BOSTON, MASSACHUSETTS.

PACKING COMPOUND.

SPECIFICATION forming part of Letters Patent No. 633,961, dated September 26, 1899.

Application filed April 4, 1898. Serial No. 676,326. (No specimens.)

*To all whom it may concern:*

Be it known that I, CHARLES L. IRESON, a citizen of the United States, residing at Boston, in the county of Suffolk and State of Massachusetts, have invented a new and useful Improvement in Packing Compounds, of which the following is a full, clear, and exact description.

The invention relates to a steam packing compound adapted for packing all kinds of joints. It belongs to the class of packing known as "sheet" packings, which are based on a vulcanizable rubber stock and suitable refractory matter.

The invention consists in combining with such vulcanizable rubber stock a compound of ultramarine-blue and silicate of magnesia, as I have found that such a compound mixed with the ordinary compounds employed in sheet-packings of this character gives the sheet-packing very desirable properties which it otherwise lacks, it having greater heat-resisting properties combined with longer life and greater endurance. One of the principal objections to these packings is the deterioration when not in use and when in use from the too rapid vulcanization, and I have ascertained that ultramarine-blue combined with the silicate of magnesia has a deterring effect in respect to deterioration, whereby the life of the packing is made longer than would otherwise be the case.

The compound, with the exception of the ultramarine-blue and the silicate of magnesia, may be of any of the ordinary constituents employed in the manufacture of sheet-packings, such constituents being rubber, a suitable quantity of sulfur, and generally some powdered zinc, paris-white, and litharge. A desirable compound will be obtained by employing about seventeen or eighteen per cent. of rubber, one to one and one-half per cent. of sulfur, four to five per cent. of powdered zinc, eight to ten per cent. litharge, and sixteen to eighteen per cent. paris-white. These ingredients, however, may be varied to some extent, and the litharge may be omitted, if desired, and chemical equivalents for the other ingredients may be employed. These ingredients are then intimately combined with silicate of magnesia of, say, from forty or forty-five per cent. and with ultramarine-blue of from seven to ten per cent. I prefer to embody the ultramarine-blue with the ingredients first named. This may be combined with them and then mixed with the silicate of magnesia and may be done by a mixing-roll and in sheeting in the ordinary ways well known to makers of these compounds.

I do not intend to be understood as limiting myself to the exact proportions of silicate of magnesia and ultramarine-blue named, as these may also be varied without departing from the essential features of my invention.

I am aware of Letters Patent to Hall, No. 597,357, and disclaim the invention therein described.

Having thus fully described my invention, I claim and desire to secure by Letters Patent of the United States—

As an improved article of manufacture a rubber compound of the character specified, having combined with it ultramarine-blue and silicate of magnesia in about the proportions named.

CHAS. L. IRESON.

Witnesses:
F. F. RAYMOND, 2d,
J. M. DOLAN.